United States Patent Office 2,750,928
Patented June 19, 1956

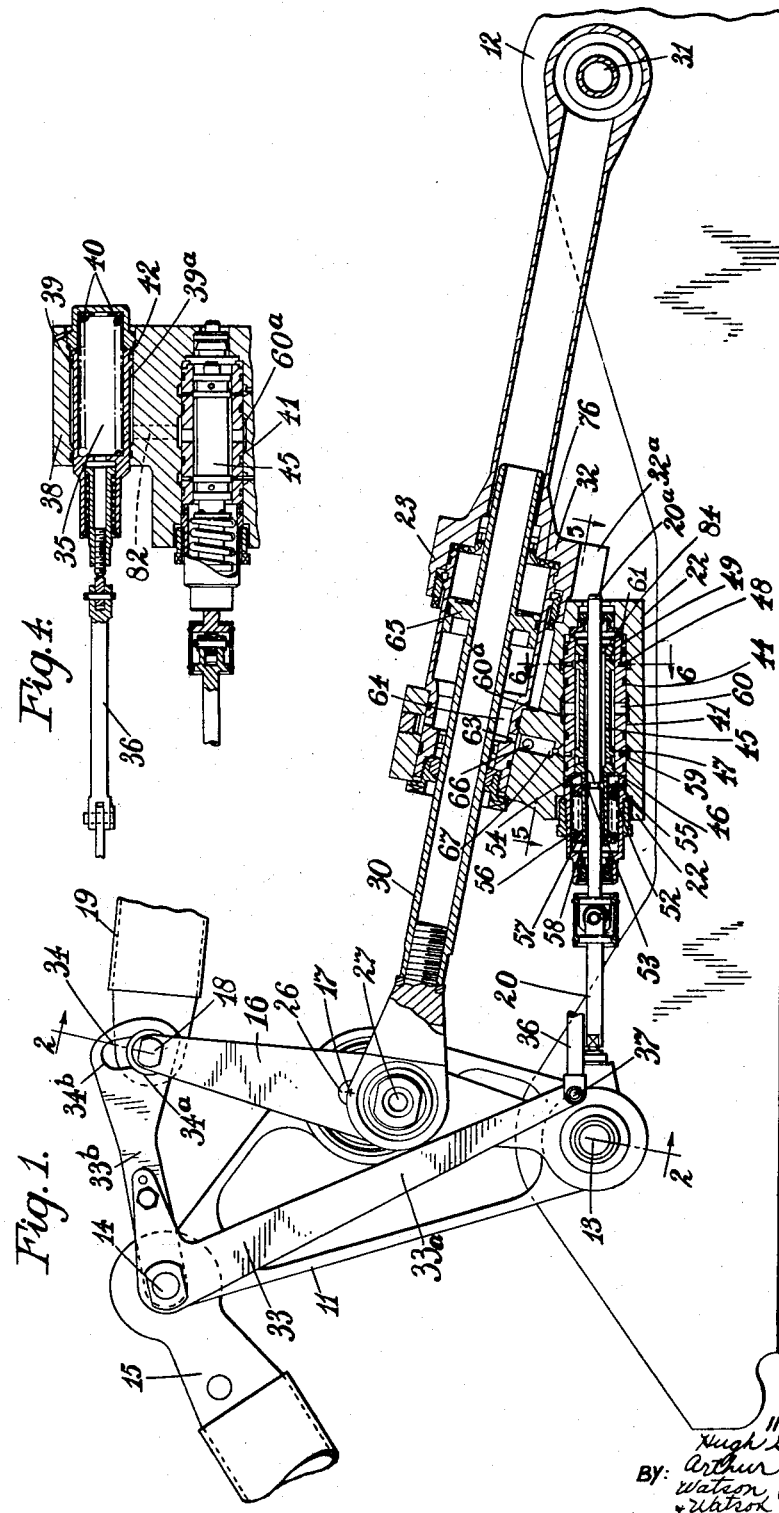

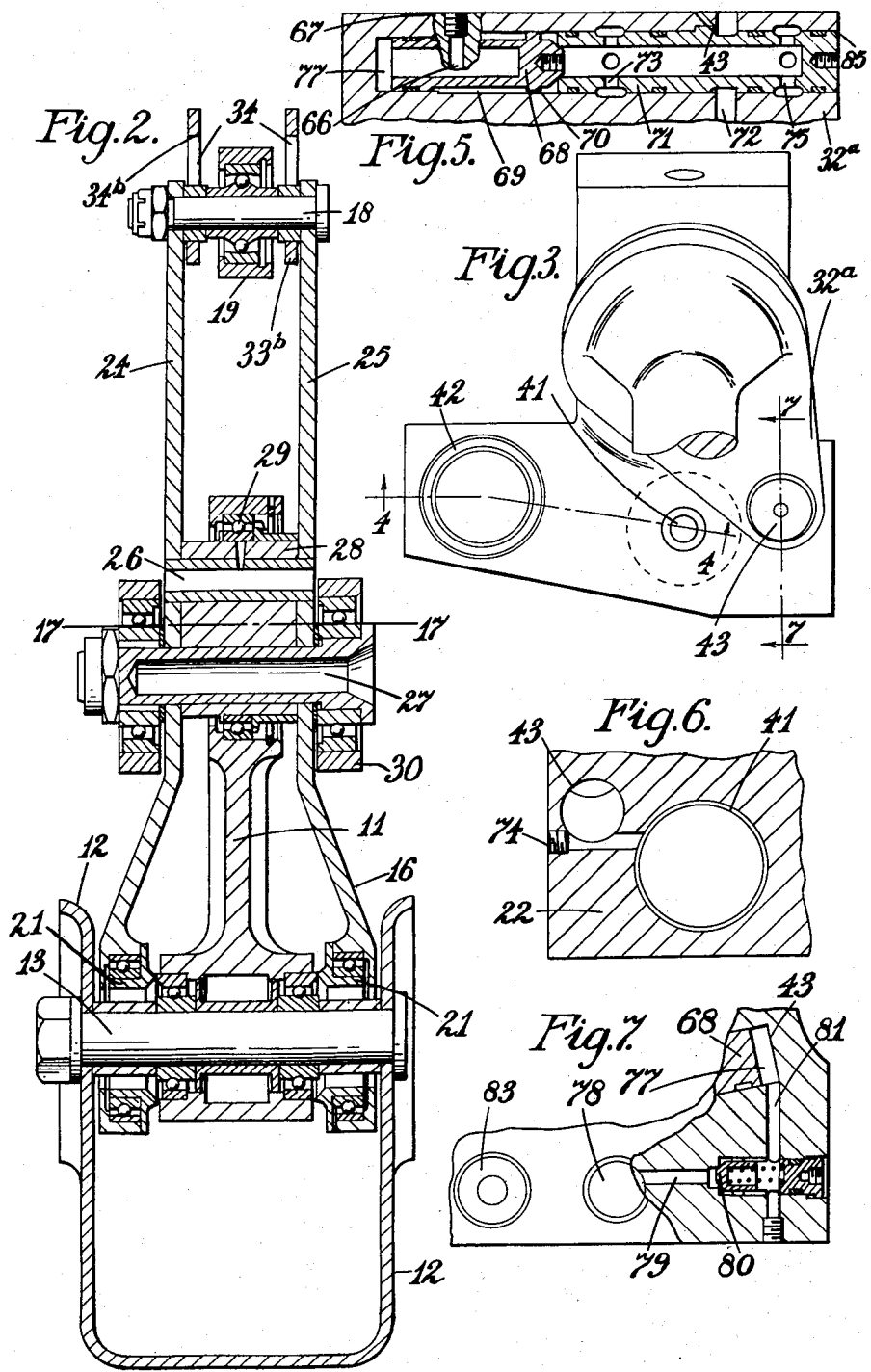

2,750,928

SERVO-ASSISTED CONTROL SYSTEMS

Hugh Graham Conway and Arthur Ernest Elmer, Gloucester, England, assignors to British Messier Limited, Gloucester, England, a British company Application May 26, 1953, Serial No. 357,452

Claims priority, application Great Britain May 28, 1952

12 Claims. (Cl. 121—41)

The present invention relates to servo-mechanisms, and is concerned primarily but not exclusively with servo-mechanisms for employment on aircraft for affording power-assistance to pilots in the operation of flying controls and the like. Such a servo-mechanism normally comprises an operator's control member and a powered booster both operatively connected to an element to be moved, for example a flying control surface, the initial part of any deflection of the operator's control member to move said element serving to actuate control means for the booster thereby bringing the booster into action to perform or assist the movement; the present invention relates to mechanisms of this type.

According to the present invention in a servo-mechanism of the type described, for example for use on aircraft, the operative connections between the operator's control member and the powered booster on the one hand, and the element to be moved on the other, include an output lever or its equivalent pivoted upon the structure of the aircraft or the like, and connected to said element so that angular movement of the lever effects adjustment thereof, the operator's control member is connected to the output lever through the intermediary of an input member to which an actuating rod or the like for the booster control means is pivotally connected and which is mounted upon the output lever to be movable with respect thereto to an extent sufficient for actuating the booster control means, and the axis of the pivotal connection of the booster control actuating rod to the input member is arranged to be substantially in line with the axis of the output lever pivot.

The powered booster may be a fluid pressure operated piston-and-cylinder device or jack, and the booster control means a jack control valve determining the flow of pressure fluid to and from the chambers of the jack.

Since the pivotal connection between the input member and the rod for actuating the jack control valve is substantially in line with the pivot of the output lever, the position of said pivotal connection remains practically the same during operation of the servo-mechanism, and therefore the control valve may be, in the case of an aircraft, more or less fixed to the airframe. It has normally been necessary hitherto for the jack control valve in such servo-mechanisms to be carried upon the movable part of the jack, that is the jack rod and piston, in order that the valve shall follow-up the movements of the mechanism to secure proper operation of the servo control, and this tends to make the movable part of the jack cumbersome and entails the use of lengths of flexible piping to supply the pressure fluid, but in the present construction the control valve is not required to perform any follow-up movement and may therefore be mounted on the stationary part of the jack, that is the cylinder body, so that the need for relatively long flexible piping is avoided.

Preferably, the input member comprises a lever pivotally mounted upon the output lever, and the operator's control member and the powered booster are connected to the input lever on opposite sides of its pivotal mounting so that they exert rotational effort upon the input lever in opposite directions. This enables the pilot, or other operator, to "feel" the effort which is being put out by the booster or jack in operating the element to be moved, since the rotational couple upon the input lever due to his own effort is opposed by the jack force, and the amount of this "feel" is determined by the ratio of the respective distances of the jack connection and the operator's control connection on the input lever from the axis of the pivotal mounting of said lever.

According to a further feature of the invention provision is made for locking the input lever rigidly to the output lever for full manual operation in the event of failure of the booster, and when the booster is a fluid pressure operated jack, an emergency fluid pressure controlled locking device may be provided to perform this function automatically in the event of failure of the fluid pressure supply to the booster jack. Thus, the locking device may be spring urged toward locking position, but held off during normal operation of the booster jack by fluid pressure in the line supplying the jack.

One form of construction in accordance with the invention, for the operation of flying control surfaces and the like aboard aircraft, will be described by way of example, and with reference to the accompanying drawings in which:

Figure 1 is an elevation, in part section, of the mechanism,

Figure 2 is a section on the line 2—2 of Figure 1,

Figure 3 is an end view of the mechanism in the direction of the arrow 3 of Figure 1.

Figure 4 is a section on the line 4—4 of Figure 3,

Figure 5 is a part section on the line 5—5 of Figure 1,

Figure 6 is a part section on the line 6—6 of Figure 1, and

Figure 7 is a part section on the line 7—7 of Figure 3.

In the drawings, a lever 11 is pivoted at its lower end upon the aircraft structure 12 by pivot 13, and its upper end is pivoted at 14 to a rod 15 serving to couple it to a flying control surface (not shown) of the aircraft whereby angular movement of the lever 11 about its pivot 13 effects movement of the control surface. This lever 11 constitutes the output lever of the system and is in the form of a plate which is triangularly-shaped in the plane of its movement, the aforementioned pivots 13 and 14 being located at two corners thereof. At the third corner which is situated at a height about half way between the aforementioned pivotal connections of the output lever 11, a further lever 16 constituting the input lever of the system is articulated upon the output lever 11, the pivot 17 being about midway along the input lever 16. The input and output levers are the same length and they normally occupy positions in which they are at about 30° to one another, that is the longitudinal axis of the input lever 16 makes an angle of 30° with the common plane of the axes of the pivots 13 and 14 at the uppermost and lowermost corners of the output lever 11.

The input lever 16 is connected by pivot 18 at its upper end to a pilot's control rod 19, and at its lower end to a valve rod 20 by a twin-bearing pivot 21, this valve rod operating a sliding piston valve shown generally at 22 which controls the admission and exhaust of pressure fluid to and from a hydraulic jack shown generally at 23, this jack providing the power boost for flying control surface operation. The axis of pivot 21 is arranged to be in line with the axis of pivot 13 when the jack control valve 22 is in its central or neutral position, and only a small movement of the valve of the order of a tenth of an inch, is required in either direction from neutral position to bring the jack 23 into full operation. This movement is achieved by reason of the fact that the twin-bearing pivot 21 surrounds the pivot 13 and an annular space is left between them affording lost motion. The lost motion is sufficient to allow all the necessary small relative movements of the pivots required to operate the control valve 22.

The input lever 16 is constructed from two parallel arms 24 and 25 one on each side of the output lever 11 and united at their upper ends by pivot 18; the arms are also united about midway along their length by two pins 26 and 27 about an inch apart along the lever axis, and both passing through a hub member 28 which is thereby held rigidly between the arms 24 and 25 and which is mounted in a ball bearing 29 on the output lever 11 to form the pivot 17 between the input and output levers. The two pins 26 and 27 pass through the hub member 28, pin 26 being above and pin 27 below the axis of the ball bearing 29. The lower pin 27 projects beyond the arms of the input lever at each side and provides a pivot connection for the end of the jack rod 30 of the aforementioned booster jack 23. At the opposite end of the jack 23 the cylinder body 32 thereof is hinged at 31 upon the airframe 12, and the jack control valve 22 is mounted upon said cylinder body 32.

In operation, when the pilot's control rod 19 is moved the input lever 16 is turned a small amount about its pivot 17 on the output lever 11, thereby operating the jack control valve 22 and bringing the booster jack 23 into action. The pilot's effort and the effort of the jack 23 tend to rotate the input lever 16 in opposite directions about its pivot 17 on the output lever 11, while both combine to move the output lever angularly about its pivot 13 on the airframe 12 so that adjustment of the flying control is effected.

Since the effort of jack 23 acts against the pilot's effort about the point 17 of articulation of the input lever 16, the pilot can "feel" the effort exerted by the jack, the amount of the "feel" being equal to the jack effort reduced in the ratio of the distance between the pivot 27 of the jack rod and the point of articulation 17 of the input lever 16, which distance is quite small, and the distance between said point of articulation 17 and the pivot 18 of the pilot's control rod 19, which is nearly half the length of the input lever. It will also be clear that as soon as the pilot ceases to exert effort upon his control, the movement of the mechanism stops because the booster jack 23 swings the input lever 16 about its point of articulation 17 to centre the pivot 21 at the lower end thereof and thereby move the jack control valve 22 to the neutral position.

In order that the pilot shall be able to take over full manual operation of the flying control surface in the event of failure of the booster circuit means is provided for locking the input and output levers together. A bell crank lever 33 is pivoted on the output lever 11 (at pivot 14), at the upper end thereof, and has one arm 33a extending downwardly and the other arm 33b extending across to meet the upper end of the input lever 16. The arm 33b has a slot or aperture 34 through which passes the pivot pin 18 connecting the input lever 16 to the pilot's control rod 19, and the slot or aperture has two parts 34a and 34b, into the confines of one or other of which the said pin 18 can be brought by a small angular movement of the bell crank lever 33. Part 34a of the slot is wide enough to allow some free play for the pivot pin 18, while part 34b is narrow so that the pivot pin is a close fit therein, part 34a leading into part 34b through a converging part. Thus, when the pin is in the wide part 34a of the slot the input lever 16 is able to swing with respect to the output lever 11 to a sufficient extent to operate the jack control valve 22 and bring the booster jack 23 into operation, but a small movement of the bell crank lever 33 brings the pin 18 into the narrow part 34b of the slot and the input and output levers are then locked together for manual operation.

The wider part 34a of the slot only allows sufficient free play to permit the pilot to operate the jack control valve 22 and to "feel" the effort of the booster jack 23. If the pilot exerts an effort greater than is necessary to balance the booster jack effort on the input lever 16, then the free play is taken up, the pivot pin 18 buts against the side of the slot and the excess effort is transmitted directly to the output lever 11, so that no excessive loads are transferred to the jack control valve 22.

The locking of the parts for manual operation is brought about by a small emergency locking jack shown generally at 35, which is carried at the side of the valve block of the main booster jack 23 and has its jack rod 36 connected to the end of the lower arm 33a of the bell crank lever 33 by pivot 37. The locking jack 35 comprises a cylinder 38 containing a piston 39 which is acted upon by a compression spring 40 which urges the jack piston 39, and consequently the bell crank lever 33 into locking position, but during normal operation of the booster jack 23 the parts are held in the unlocked position by pressure fluid supplied to the cylinder 38 of the locking jack from the supply line for the main jack 23 and acting on the locking jack piston 39 in the opposite direction to the compression spring 40. Should the supply of fluid pressure to the booster jack fail, it will be seen that the parts of the servo mechanism are automatically locked for manual operation, and the parts may be locked at will on any occasion by exhausting the pressure fluid from the locking jack 35.

Since the pivot connection 21 of the valve rod 20 of the jack control valve to the input lever 16 is in line with the pivot 13 of the output lever 11 on the airframe 12 when the valve 22 is in neutral position, the control valve does not oppose manual operation of the flying control surface by the pilot if, for example, there is some residual pressure in the fluid lines or a valve seizure occurs. Moreover, the axis of the pivotal connection 37 between the bell crank lever 33 and the jack rod 36 of the locking jack 35 is also arranged to be in line with the axis of the output lever pivot 13 when the parts are locked, thus avoiding any loading opposing the pilot's control movement during manual operation which would otherwise occur if the said pivotal connection 37 were located in a position where it would be displaced by angular movement of the input and output levers.

Provision is made to ensure that, on failure of the pressure supply to the system, the pressures on either side of the booster jack are relieved and balanced, so that when the aircraft surfaces are manually controlled there is no resistance by the booster jack. The jack control valve body 22 mounted on the jack body 32 is provided with three bores 41, 42 and 43, two of which, 41 and 42 are shown as horizontal in the drawings while the third, 43, is parallel to the booster jack casing. Bore 41, which is the main control valve bore, contains a perforated sleeve 44 inside of which is a perforated hollow valve member 45 which incorporates lands 46, 47, 48 and 49. Between lands 46 and 47 are radial holes 50, and similarly between lands 48 and 49 are radial holes 51. At its left hand end in Figures 1 and 4 the bore of this valve member 45 is reduced in diameter to provide a bearing for a rod 20a which is connected to the valve rod 20. This rod 20a is provided with a V groove at 52 which forms a seating for a ball 53 situated in a radial hole 54 in the valve member 45 in such a manner that the surface of the ball opposite to that seated in the V groove projects from the exterior of the valve 45 and normally abuts against a circular seating ring 55 for a coal spring 56, this seating being a sliding fit on the valve 45. The opposite end of this spring is retained by a second circular seating ring 57 mounted at the extreme left hand end of the valve member 45, and held in fixed axial relation thereto by a circlip 58.

The sleeve 44 is provided with three sets of radial holes 59, 60 and 61, and the pressure fluid inlet connection 78 (Figure 7) for the unit communicates with holes 60 via an annular recess 60a in the bore 41. Holes 59 communicate via channel 62 in the valve body 22 and via ports 63 in the jack body 32 with chamber 64 on the left hand side of the jack piston 65. At right-angles to channel 62 is a channel 66 which leads into a balancing valve (Figure 5) shown generally at 67 in bore 43 in the jack control valve body 22. The bore 43 contains a valve member 68, slidable therein, which is reduced in diameter at its middle part to form an annular chamber 69 which is open at its right-hand end in Figure 5 through slots 70. The channel 66 leads into the annular chamber 69. The bore 43 also contains, at its other end a fixed perforated sleeve 71 which projects from the open end of the bore and bridges a gap 72 between the valve body 22 and a downwardly projecting part 32a of the jack body 32, this sleeve also being fixed within a bore 85 in the projecting part 32a and being blanked at this end.

The valve member 68 is provided with a chamfered part at its right-hand end, this chamfered part normally seating on a corresponding part on the left-hand end of the sleeve 71 thereby forming a seal. The sleeve 71 is provided with radial ports 73 which are in communication with a channel 74 (Figure 6) in the valve body 22 leading to the holes 61 in the sleeve 44 of the jack control valve. Towards its opposite end the sleeve is provided with radial ports 75 which are in communication with a channel 76 (Figure 1), in the jack body 32, which leads to the right-hand side of the piston 65 of the jack 23. The chamber 77 at the left-hand end of the valve 68 is pressurised by fluid from the inlet connection 78 which passes through a passage 79, a non-return valve 80 and a passage 81 (Figure 7).

The bore 42 in the valve body 22 contains the aforedescribed locking jack piston 39 (Figure 4). Fluid is delivered to the annular piston chamber 39a via passage 82 which is in communication with the inlet 78 through the annular recess 60a in the bore 41. The fluid return or exhaust connection 83 (Figure 7) is in communication with the annular chamber 84 surrounding the stem 20a.

In operation, if the valve member 45 is moved to the left, pressure fluid admitted from the inlet 78 passes through holes 60 into the annular chamber between lands 47 and 48 and via holes 59, channel 62 and ports 63 into chamber 64 on the left-hand side of piston 65 thus moving the piston to the right. At the same time fluid passes through passage 66 into the annular chamber 69 in the balancing valve 67. Fluid on the other side of the piston passes through channels 76, ports 75, the hollow sleeve 71, ports 73, channel 74 and holes 61 and 51 into the annular chamber 84 and thus to return 83.

At the same time fluid is delivered from the inlet 78 via passage 79, non-return valve 80 and passage 81 to chamber 77 to maintain the balancing valve 68 in the closed position. Fluid is also delivered to the locking jack piston via passage 82 to keep the locking mechanism in the unlocked position. Since the fluid is fed direct from the inlet for these two services, movement of the valve 45 does not affect them. The only time when the positions are not maintained is on failure of the fluid supply.

If the valve 45 is moved to the right, then pressure fluid passes via holes 61, passage 74, ports 73, hollow sleeve 71, ports 75 and passage 76 to the right-hand side of jack piston 65. As the piston moves to the left, fluid on the other side of the piston passes via ports 63, passage 62, holes 59 and holes 50 into the annular chamber 84 and thus to return 83.

In the event of failure of the fluid supply pressure, the locking jack piston 39 will move to the left under the influence of coil spring 40. This movement will cause the jack rod 36 to move the bell crank lever 33 sufficiently in a clockwise direction about pivot 14 to lock the input and output levers 16 and 11 together so that the control surface may be operated directly by the pilot with no servo assistance, and so that the linkage is free from backlash. It will be seen that as the input lever is moved about the pivot 21 the jack rod 30 of the jack 23 will move with it. Thus it is necessary to relieve and balance the pressures on either side of the piston 65 so that there is no appreciable hydraulic resistance during manual operation of the system. The balancing valve assembly 67 ensures this.

Assuming that the fluid pressure has failed and that the pilot's control is moved to the left, the input lever 16 will first move so as to take up the clearance between its lower end and that of the output lever 11, and will then pivot about the common axes of pivots 13 and 21. Continued movement of the pilot's lever 19 to the left will build up a hydraulic pressure on the left-hand side 64 of the piston 65 of the servo jack 23. This pressure will be communicated by passage 62 and passage 66 to annular chamber 69, and so move valve member 68 to the left, thus opening the seating of the valve 68 on the sleeve 71. This places the left-hand side of the piston 65 in communication with its right-hand side via the passages already referred to and ports 75 and passage 76.

If on the other hand, the pilot's control is moved to the right, hydraulic locking will occur on the right-hand side of piston 65, this giving rise to pressure which is in communication via passage 76 and ports 75 with the interior of the hollow sleeve 71, this acting on the end of valve 68 and opening the seating between the valve and the sleeve thus placing the right-hand side of the piston 65 in communication with the left-hand side.

In the event of seizure of the jack valve 45, automatic locking under the control of the locking jack will be possible by means of the ball 53 which is normally seated in the V groove 52 in rod 20a. Any overload will cause the ball to ride out of the groove and move outwardly against the chamfered abutment on the coil spring seating ring 55, and thus against the pressure of spring 56, so that the rod 20a will become detached from the valve 45 to permit the mechanism to be locked for manual operation.

We claim:

1. In a servo-assisted control system of the class described, the combination of a movable element to be controlled, a powered booster operatively connected to said element, a pivotally-mounted output lever connected to the element to be controlled in such manner that angular movement of the lever about its pivot effects adjustment of said element, an input member mounted upon the output lever to produce said angular movement, an operator's control member connected to move the input member, control means for the powered booster, an actuating rod for the booster control means pivotally connected to the input member, the pivotal connection of the booster control actuating rod to the input member being substantially co-axial with the axis of the output lever pivot, and the mounting of the input member on the output lever being such as to allow limited relative movement between the input member and the output lever whereby the initial part of any deflection of the operator's control member to move the element to be controlled serves to initiate the control means for the booster thereby bringing the booster into action to assist the movement, and locking means for locking the input member to the output lever for full manual operation in the event of failure of the powered booster.

2. A servo-mechanism for affording power assistance to an operator in the operation of an element to be actuated in an aircraft or the like, comprising an output lever pivoted upon the aircraft structure and connected to the said element, an input member pivotally mounted on the output lever and capable of making limited relative angular movement with respect thereto, an operator's control member connected to the input member, a powered booster pivotally connected to the input member, booster control means for the powered booster, an actuating rod for the said booster control means pivotally connected to the input member at a point substantially co-axial with the output lever pivot whereby the initial part of any deflection of the operator's control member to move the element to be controlled serves to initiate the control means for the booster thereby bringing the booster into action to assist the movement, and locking means for locking the input member to the output lever for full manual operation in the event of failure of the powered booster.

3. A servo-mechanism as claimed in claim 2, wherein the locking means comprises a double-armed lock lever pivoted on the output lever, one arm being coupled to the input member in such manner that swinging of the lock lever about its pivot moves said arm between an unlocked position in which there is free play between the arm and the input member and a locked position in which the arm acts as a rigid connection between the input member and the output lever, and the other arm being connected to means for swinging the lock lever to operate the lock.

4. A servo-mechanism as claimed in claim 3, wherein the operator's effort is transmitted to the input member through a pivotal connection on said lever, the output lever transmits effort to the movable element through a pivotal connection on said output lever, and said two pivotal connections and that between the output lever and the aircraft structure lie at the corners of a triangle, with the pivot between the input member and output lever lying in line between said first and third-mentioned pivotal connections, the pivot of the lock lever co-axial with said second-mentioned pivot, and the connection of one of the lock lever arms to the means for swinging the lock lever being a pivotal connection substantially co-axial with said third-mentioned pivot.

5. In a servo-assisted control system of the class described, the combination of a movable element to be controlled, a fluid pressure operated piston and cylinder booster unit operatively connected to said element, a pivotally mounted output lever connected to the element to be controlled in such manner that angular movement of the lever about its pivot effects adjustment of said element, an input member mounted upon the output lever to produce said angular movement, an operator's control member connected to move the input member, a control valve for determining the flow of pressure fluid to and from the piston and cylinder booster unit, an actuating rod for the control valve pivotally connected to the input member, the pivotal connection of the control valve actuating rod to the input member being substantially co-axial with the axis of the output lever pivot, and the mounting of the input member on the output lever being such as to allow limited relative movement between the input member and output lever whereby the initial part of any deflection of the operator's control member to move the element to be controlled serves to initiated the control means for the piston and cylinder booster unit thereby bringing the booster unit into action to assist the movement, and locking means for locking the input member to the output lever for full manual operation in the event of failure of the booster unit.

6. A servo-assisted control system as claimed in claim 5, wherein the locking means is operatively connected to a piston and cylinder lock-controlling device, the piston of said device being normally held against the action of a spring by fluid pressure from the booster unit supply line in a position in which the locking means is unlocked, but being released to allow the locking means to be spring-urged into locking position when the supply line pressure fails.

7. A servo-assisted control system as claimed in claim 5, wherein a pressure-balancing connection is provided between the chambers on opposite sides of the booster unit piston and incorporating a valve which is closed during normal operation of the booster, but is arranged to open and relieve pressure build-up due to hydraulic lock in the booster cylinder in the event of failure of the booster supply system.

8. A servo-assisted control system as claimed in claim 7, wherein the valve in the pressure-balancing connection is arranged to be urged toward the open position whenever the pressure in either one booster cylinder chamber exceeds that in the other, and the valve is controlled by a piston which is subjected to the fluid pressure in the booster supply line serving to hold the valve closed during normal operation of the booster.

9. A servo-assisted control system as claimed in claim 5 wherein the actuating rod for the booster unit control valve is connected to said valve through a yielding connection permitting of automatic disconnection of the rod from the valve in the event of overload due to valve seizure.

10. A servo-assisted control system as claimed in claim 9 wherein the yielding connection comprises a spring-pressed ball accommodated partly in a recess in the rod and partly in a recess in the movable valve member, and capable of leaving one recess against the spring action, under overload conditions, to disconnected the rod from the valve member.

11. A servo-mechanism for affording power assistance to an operator in the operation of an element to be actuated in an aircraft or the like, comprising an output lever pivoted upon the aircraft structure and connected to the said element, an input member pivotally mounted on the output lever and capable of making limited relative angular movement with respect thereto, an operator's control member and a powered booster pivotally connected to the input member on opposite sides of its pivotal mounting so that they exert rotational effort upon the input member in opposite directions, booster control means for the powered booster, an actuating rod for the said booster control means pivotally connected to the input member at a point substantially co-axial with the output lever pivot whereby the initial part of any deflection of the operator's control member to move the element to be controlled serves to initiate the control means for the booster thereby bringing the booster into action to assist the movement, and locking means for locking the input member to the output lever for full manual operation in the event of failure of the powered booster.

12. A servo-mechanism for affording power assistance to an operator in the operation of an element to be actuated in an aircraft or the like, comprising an output lever pivoted upon the aircraft structure and connected to the said element, an input member pivotally mounted on the output lever and capable of making limited relative angular movement with respect thereto, an operator's control member and a powered booster pivotally connected to the input member on opposite sides of its pivotal mounting so that they exert rotational effort upon the input member in opposite directions, the distance between said pivotal mounting and the booster connection pivot being small as compared with the distance between said pivotal mounting and the pivot of the control member connection, booster control means for the powered booster, an actuating rod for the said booster control means pivotally connected to the input member at a point substantially co-axial with the output lever pivot whereby the initial part of any deflection of the operator's control member to move the element to be controlled serves to initiate the control means for the booster thereby bringing the booster into action to assist the movement, and locking means for locking the input member to the output lever for full manual operation in the event of failure of the powered booster.

References Cited in the file of this patent

UNITED STATES PATENTS

| | | |
|---|---|---|
| 1,869,956 | Dewandre | Aug. 2, 1932 |
| 2,284,298 | Newton | May 26, 1942 |
| 2,462,994 | Price | Mar. 1, 1949 |
| 2,591,871 | Richolt | Apr. 8, 1952 |
| 2,623,502 | Lisle | Dec. 30, 1952 |
| 2,675,786 | Bergey | Apr. 20, 1954 |

FOREIGN PATENTS

| | | |
|---|---|---|
| 424,952 | Great Britain | Dec. 4, 1933 |